April 6, 1943.  J. G. BAKER  2,315,578
APPARATUS FOR BALANCING
Filed March 23, 1939  3 Sheets-Sheet 1
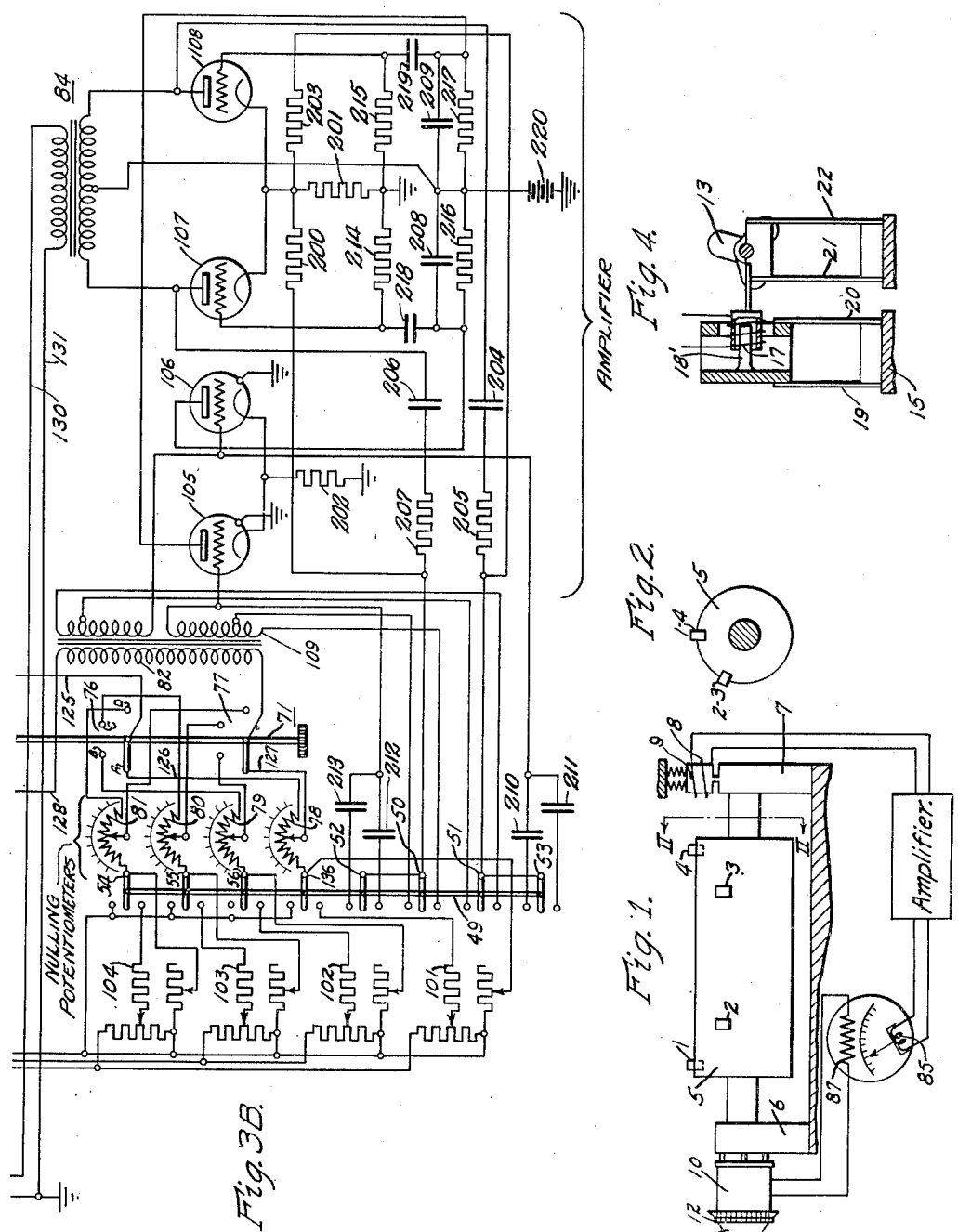
WITNESSES:
INVENTOR
John G. Baker.
BY
Paul E. Friedemann
ATTORNEY

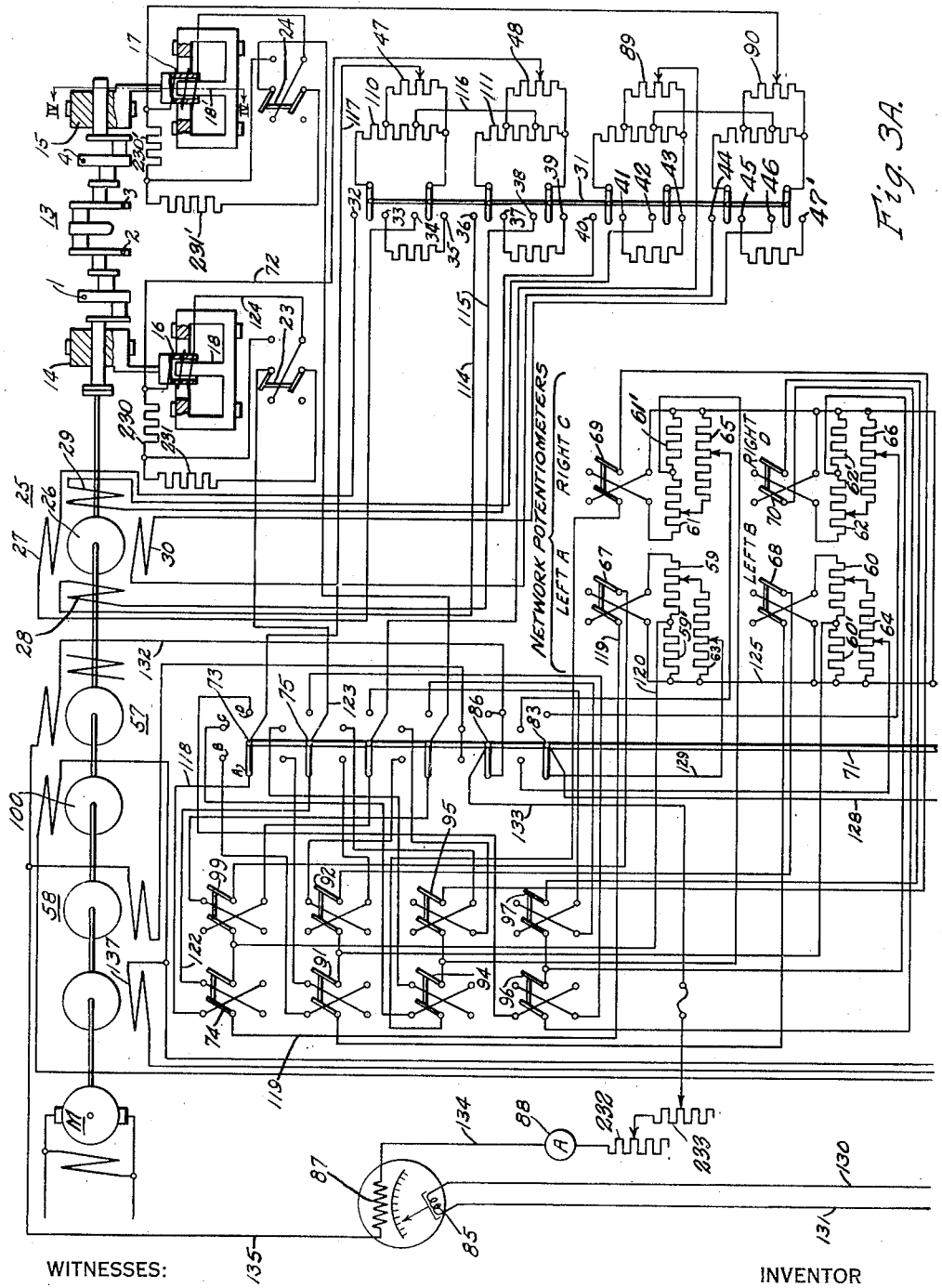

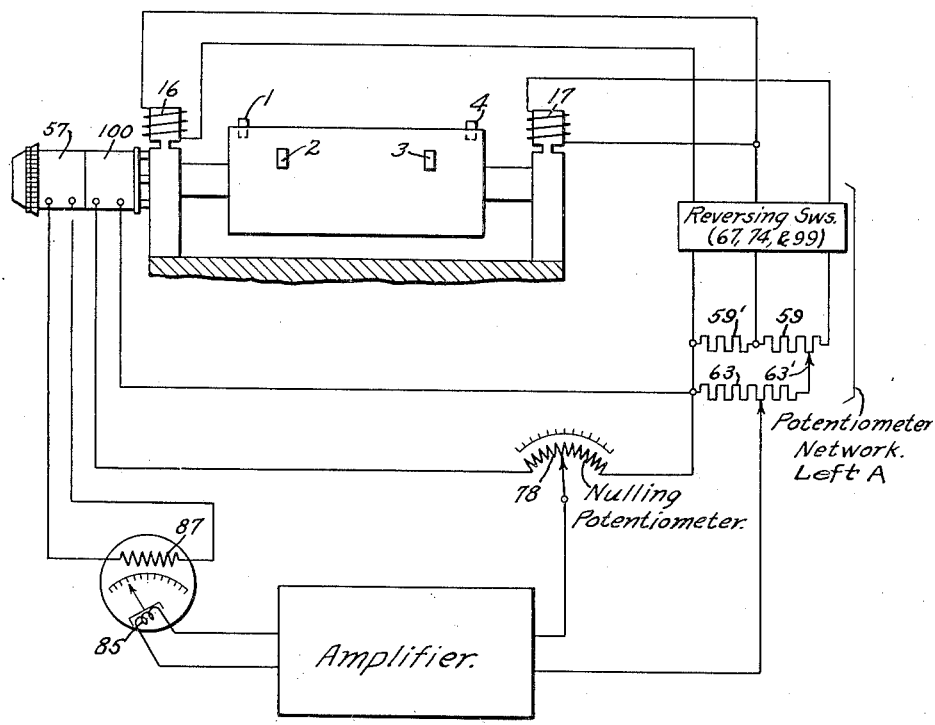

Patented Apr. 6, 1943

2,315,578

UNITED STATES PATENT OFFICE 2,315,578

APPARATUS FOR BALANCING

John G. Baker, Evansville, Wis., assignor to Westinghouse Electric & Manufacturing Company, East Pittsburgh, Pa., a corporation of Pennsylvania Application March 23, 1939, Serial No. 263,703

8 Claims. (Cl. 73—53)

My invention relates to a balancing machine for determining the amount and location of unbalance in rotors, such as crankshafts and the like.

An object of my invention is to provide a balancing machine which will accurately determine the location and amount of unbalance of rotors such as crankshafts and the like.

Another object of my invention is to provide a balancing machine which is adapted to quickly and accurately determine unbalance of rotors, such as crankshafts, and which is adapted for quantity or large scale production of rotors to be balanced.

Other objects and advantages will become more apparent from a study of the following specification when considered in conjunction with the accompanying drawings, wherein:

Figure 1 is a simplified schematic showing of a device embodying one of the broad principles of my invention;

Fig. 2 is a sectional view taken on line II—II of Fig. 1;

Figs. 3A and 3B taken together constitute a schematic showing of a complete device embodying the principles of my invention; and Fig. 4 is an enlarged sectional view taken on line IV—IV of Fig. 3A.

Fig. 5 is a schematic showing of a typical circuit, namely, that for measuring unbalance of No. 1 point, which circuit is identical to that shown in Figs. 3A–3B except that many of the parts have been eliminated for the sake of simplicity and only the outstanding elements of the circuit have been shown so as to more clearly explain the theory of operation.

Crankshafts are so constructed that the unbalance can be removed from only certain limited areas. Therefore, they are deliberately made so that the unbalance will fall within the area from which it can be removed. It is possible to balance ordinary rotors by removing one amount of weight at a certain location on one end and by doing a similar operation on the other end. Of course, instead of removing the weight from the heavy spot it would be possible to remove components of weight from locations on each side of the heavy spot. In the crankshaft the construction is such that there are only two positions from which weight can be removed and, as mentioned above, the shafts are so constructed that the weight to be removed is caused to fall between these two positions. Therefore, components of weight are removed from each side of the heavy spot to balance the crankshaft. This operation is, of course, required on each end of the crankshaft. Therefore, a crankshaft has four prescribed points from which weight can be removed. The purpose of the control system and machine embodying my invention is to indicate the amount of unbalance to be removed from each of these four prescribed points on the crankshaft. Naturally, this machine is not limited for use on crankshafts alone but may be used with respect to any type of rotor which requires dynamic balancing but crankshaft balancing will probably be its largest application.

Referring to Figures 1 and 2, numerals 1, 2, 3 and 4 denote four correction locations at which it is desired to know the unbalance components on a rotor 5 which roughly corresponds to a crankshaft which is to be balanced. Points 1 and 4 are in an axial plane designated as 1—4, and points 2 and 3 are in an axial plane designated as 2—3. No two correction locations need be in the same transverse plane. Plane 1—4 is at an angle with respect to plane 2—3 of from about 60° to about 120°.

The method of balancing a rotor in accordance with the principles of my invention may be broadly stated as follows:

First, flexibly support the rotor. Second, use pick-ups and circuit networks such as described in Patent No. 2,165,024 by F. C. Rushing and myself, issued July 4, 1939, entitled "Indicating balancing machine" or a mechanical structure such that four voltages, $V_1$, $V_2$, $V_3$ and $V_4$ are obtained, voltage $V_1$ being independent of unbalance effects in No. 1 correction location, voltage $V_2$ being independent of unbalance effects in No. 2 location, voltage $V_3$ being independent of unbalance effects in No. 3 location, and voltage $V_4$ being independent of unbalance effects in No. 4 location. Third, provide two metering arrangements, one designated by the symbol I—IV and the other designated by the symbol II—III. Metering arrangement I—IV is to be such that it will not read voltages resulting from unbalances in plane 1—4 but will read voltages resulting from unbalances in any other plane. Metering arrangement II—III to be such that it will not read voltages resulting from unbalances in plane 2—3 but will read voltages resulting from unbalances in any other plane. Fourth, to read the unbalance correction corresponding to the No. 1 location, use voltage $V_4$ and metering arrangement II—III. Since voltage $V_4$ is independent of the unbalance component at location No. 4 and since metering arrangement II—III is unaffected by the unbalance components at 2 and 3, this combination will give a reading depending only on No. 1 unbalance component and, therefore, by means of a calibration can be used as a measure of the No. 1 correction required. Similarly, to read the correction required at 2 use voltage $V_3$ and metering arrangement I—IV; to read correction 3 use voltage $V_2$ and metering arrangement I—IV; to read correction 4 use voltage $V_1$ and metering arrangement II—III.

Means for producing the voltages $V_1$, $V_2$, $V_3$ and $V_4$ may be either mostly electrical or mostly mechanical or a combination of these. There are several known methods of producing an indication independent of the unbalance in a given axial plane, for example: 1. The wattmeter method in which one coil of the wattmeter has a voltage applied on it which is out of phase with the voltage caused by the unbalance in the plane, and 2. The commutator direct current instrument method in which the commutator turns with the rotor and is set at such an angle that voltages resulting from unbalances in the plane have zero rectification and, therefore, cause no indication on the direct current meter connected in the commutator circuit.

The schematic circuit arrangement in Fig. 1 illustrates the wattmeter method of producing voltages $V_1$, $V_2$, $V_3$ and $V_4$ and is merely to illustrate the general principles involved in my invention. In the interest of clarity, the circuit has been reduced to its simplest form, many of the refinements being omitted, but which refinements will be described in connection with Figs. 3A and 3B, which figures described the invention in complete detail. Rotor 5 is Figs. 1 and 2 is supported by two flexible pedestals 6 and 7. A magnetic pick-up coil 8 is mounted on one of the pedestals 7, thereby vibrating therewith and effecting relative movement with respect to the fixed core element 9 (there being a spring between the frame upon which element 9 is fixed and the mandrel of coil 8), thereby inducing a current in coil 8 which is in synchronism with the vibrations of the pedestal, which in turn is caused by the unbalance of the rotor. The current in coil 8 is amplified and is conducted through the voltage or moving coil of a wattmeter. The current or stationary coil of the wattmeter is connected with the stator of a sine wave generator 10, the rotor of which is a two-pole permanent magnet which supplies the field for the generator and which is directly coupled to the rotor 5. The stator consists of a winding with a sine wave distribution which can be partially rotated by hand to change the phase of its output with respect to the rotor by means of a protractor 11 which has a suitable scale 12 to indicate the extent of rotary shift or phase shift.

There are two windings on the stator, and they are identical except for being 90° apart. After the stator of the generator is rotated to a position where the meter indicates zero, instead of rotating the stator 90° from that position to obtain the maximum meter indication, the second winding which is already 90° away can be switched across the current coil of the meter in place of the first winding. Thus, a switching operation is used instead of a 90° rotation of the generator stator. The power is brought out of the generator stator through slip rings which allow the stator to be freely rotated in either direction.

Since the indication of the wattmeter is proportional to the product of the voltage amplitudes of equal frequencies across its two coils multiplied by the cosine of the angle between them, it is possible with a given pick-up voltage to make the meter indicate zero or a maximum by rotating the stator of the sine-wave generator to certain positions where the two voltages (generator and magnetic pick-up) on the meter are out of phase or in phase respectively. The zero reading requires an accurate adjustment of the stator position, and the angular position of the stator for this reading is an indication of the phase angle of the pick-up voltage, which voltage bears a fixed relationship to the vibratory motion; therefore, the angular position of this stator will be referred to as the phase angle of the vibratory motion. Shifting the location of the generator winding 90° from this zero position gives a maximum deflection of the wattmeter and with the generator current amplitude always held constant, this deflection is an indication of the amplitude of the vibration being measured.

Since the voltage across the current coil of the wattmeter is a pure sine wave of a frequency which corresponds to the speed of the rotor, this method of measurement effectively filters out all vibration harmonics except that corresponding to running frequency. This characteristic makes the apparatus particularly adaptable for measuring running frequency shaft vibration where the shaft is scored and out-of-round.

Voltages proportional to the vibrations at the pedestals are generated in magnetic pick-ups. These voltages are operated on by a network and then amplified and placed across the moving coil of an indicating wattmeter.

The stator of the generator consists of a winding with a sine-wave distribution and the stator can be rotated by hand to change the phase of its output with respect to the rotor. Therefore, if the amount and timing of the voltage on the moving coil of the wattmeter is constant, moving the generator stator will cause the meter indications to vary, depending upon the angle between the two voltages. This variation is from zero to maximum and at zero indication the two voltages are exactly 90° out of phase at the meter since the cosine of 90° is zero; and since variation of the angle at this point gives a very sensitive meter variation, this zero reading position of the generator stator can be used as an indication of the position of the rotor with respect to the unbalance. Since the generator voltage is the wave of a single frequency only, the voltages from the pick-up which are of running frequency will be indicated on the wattmeter and it so happens that the voltages caused by the unbalance are inherently of running frequency, forming a complete cycle for each rotation of the rotor.

The unbalance indication is obtained through vibration measurements at the two pedestals which support the crankshaft. These pedestals are so constructed that the crankshaft rotates at a frequency which is about 2½ times the resonant frequency of the crankshaft on pedestals. Furthermore, the damping of pedestals is such that one unbalance on the rotor causes vibrations at the pedestal which are either exactly in phase or 180° out of phase. This feature enables simplifying the electric circuit over what it would be were the pedestals of a more general nature. The vibrations cause voltages to be generated in magnetic pick-up coils, one of which is located on each pedestal. Each of these pick-up coils consists of a permanent magnet which is spring mounted so that it stands stationary in space, and of a coil which follows the vibration of the pedestal and moves in the magnetic field.

Fig. 5 is a simplified schematic showing of the circuit shown in Figs. 3A and 3B. The simplification of Fig. 5 has been obtained by eliminating many less important (but still essential) parts and by selecting one specific circuit condition, namely, that obtained by turning selector switch 71 to the A position for measuring unbalance of No. 1 point. The same numerals are used in Fig. 5 that were used in Figs. 3A and 3B in order to readily identify the parts.

The outstanding features of applicant's invention may be summarized by first describing the circuit shown in Fig. 5. It will be noted that the pick up coils 16 and 17 are connected to a potentiometer network including reversing switches 74, 99 and 67, but for simplicity are represented by the block bearing the legend reversing switches. Resistor 59' is connected across the left pick up coil 16 and resistor 59 is connected across the right pick up coil 17. Set the stator winding of generator 57 so that it produces a voltage in wattmeter coil 87 which is 90° out of phase with the pick up voltage in the axial plane defined by points 2 and 3. Thus this wattmeter arrangement at points 2 and 3 nulls the effects of unbalance and is indicated when the wattmeter reading is zero. By suitably adjusting the potentiometer adjusting contact element 63' it is possible to take a fraction of the larger of the two pick up voltages (which happens to be the pick up voltage obtained by coil 17). By suitably operating the reversing switches it is possible to subtract one of the pick up voltages from the other so that there appears across the resistor 63 the voltage of only one pick up coil, the other of which has been nulled. The theory of operation of such network has been described in greater detail in Patent No. 2,165,024 referred to previously. It will thus be seen that the unbalance of point 4 has been nulled by the potentiometer network. Since the unbalance point 4 has been eliminated by the network and since the unbalance of points 2 and 3 have been eliminated by the wattmeter scheme, the only voltage remaining is that caused by unbalance point No. 1 which is sent into the unbalance terminals of the amplifier. It would be possible to read this voltage directly by the wattmeter if desired in which case, of course, the wattmeter would have to be suitably calibrated in terms of potentiometer resistor 63. Instead of doing this, however, I prefer to include a nulling generator 100 which is always in phase with generator 57 and which may be arranged so as to produce a bucking voltage which is opposite to the voltage appearing across the resistor 63 caused by unbalance point No. 1. By adjusting nulling potentiometer 78, the voltage will, in addition, be made equal to that across resistor 63. After potentiometer 78 is suitably adjusted so that the wattmeter reading is zero, the setting of the adjustable pointer of such potentiometer can be read by virtue of the calibration of the potentiometer and in this manner such potentiometer setting is a record of the amount of unbalance of point 1. So far we have considered only the measurement of unbalance of point 1. To measure the unbalance of other points, different networks, different nulling potentiometers as well as different generators will be used to avoid too much waste of time in changing adjustments as will be seen hereinafter.

For example, if it is desired to read the unbalance of point 2 (or point 3), generator 58 instead of generator 57 is used and nulling generator 137 instead of generator 100 is used. If point 4 were to be measured the same generators, namely, 57 and 100 as shown in Fig. 5 are used. Generator 25, shown in Figs. 3A and 3B, has been eliminated in Fig. 5 since such generator is used only in the initial steps for the purpose of eliminating initial unbalances in the system for the purpose of calibration and is not used when unbalance measurements are made.

The setting of potentiometer 78 necessary to make the wattmeter read zero is a visual indication of the unbalance of point 1. Referring to Figs. 3A and 3B, when selector switch 71 is turned to B position to read the unbalance of point 2, the setting of potentiometer 79 in order to make the wattmeter read zero is a visual indication of the unbalance of point 2. Likewise, the settings of potentiometers 80 and 81 are visual indications of the unbalance of points 3 and 4, respectively. This leaves the operator with four visual indications or records of the unbalance at the four points with which he may directly or indirectly adjust a drill press so as to control the amount of drilling to be made at the four points on the rotor (or crankshaft).

Figs. 3A and 3B are a schematic showing of a complete balancing machine circuit embodying the principles outlined in the above brief description of Fig. 5, but adding many refinements thereto so as to constitute a complete and operable balancing machine circuit. Numeral 13 designates a crankshaft which is to be balanced, thus it corresponds to the rotor 5 described above, having the same correction location points 1, 2, 3 and 4. The crankshaft is supported by two pedestals 14 and 15, each of which has connected thereto a movable cylindrical element which carries pick-up coils 16 and 17. These coils are adapted to move relative to fixed core or magnetic elements such as 18 and 18', respectively. Coil 16 may be referred to as the left pick-up coil and coil 17 as the right pick-up coil. This relative movement is permitted by the flexible nature of the pedestals which appears more clearly in Fig. 4, and which shows how springs 19, 20, 21 and 22 serve as mountings for the stationary and movable elements of the pick-up magnet, as well as for the crankshaft in order to allow free vibration as effected by unbalance of the crankshaft, and at the same time isolate stray vibrations from outside sources such as the framework or building.

The amplifier circuit is shown at the right hand side of Fig. 3B. The tubes are designated as 105, 106, 107 and 108. To place a signal across the grid and cathode of the tube 105, note that from switch terminal 50, which is connected to a tap off of the secondary 109 of the input transformer, the circuit leads to the right through a 10,000 ohm resistor 200, through a 500 ohm resistor 201 to ground, from ground through a 14,500 ohm resistor 202 to the cathode of tube 105, from the grid of this tube to the other end of the secondary winding 109 from which it started.

Inclusion of the 10,000 ohm resistor 200 in this signal circuit of tube 105 is made in order to introduce negative feed back into the circuit, it being noted that from the plate of the tube 107, a circuit leads through a 1 microfarad condenser 206, a 1.2 meg. resistor 207, a 10,000 ohm resistor 200 to the cathode of the tube 107. This places the entire alternating-current output voltage from this tube 107 across the 1.2 meg. resistor 201 and the 10,000 ohm resistor 200 and the part of the voltage across the 10,000 ohm resistor 200 is subtracted from the input voltage to the tube 105. This arrangement gives a conventional type of feed back.

A similar circuit places the signal voltage on the grid of tube 106. This circuit may be traced from switch 51, connected to the upper secondary of transformer 109, through 10,000 ohm resistor 203, through the 500 ohm resistor 201 to the ground, from the ground connection through the 14,500 ohm resistor 202 to the cathode of tube 106, from the cathode to the grid and from the grid to the other terminal of the upper secondary of transformer 109. Inclusion of the 10,000 ohm resistor 203 in this signal circuit of tube 106 is made in order to introduce negative feed back into the circuit, it being noted that from the plate of the tube 108, a circuit leads through 1 microfarad condenser 204, a 1.2 meg. resistor 205, the 10,000 ohm resistor 203, to the cathode of tube 108. This places the entire alternating-current output voltage from this tube 108 across the 1.2 meg. resistor 205 and the 10,000 ohm resistor 203, and the part of the voltage across the 10,000 ohm resistor 203 is subtracted from the input voltage of the tube 106. The circuit from the output of the tubes 105 and 106 to the input of the tubes 107 and 108 including, among other elements, the resistors 214, 215, 216, and 217 and condensers 218, and 219, is conventional with the exception of the two .02 microfarad condensers 208 and 209 which are used to eliminate a certain oscillation difficulty. Another unconventional feature of the circuit is the .001 and .015 microfarad condensers 211 and 213, and 210 and 212 across the secondaries of the input transformer. These condensers are also used to eliminate an undesired oscillation in the circuit. Placing the signal on the tubes 105 and 106 by going through the 500 ohm second stage biasing resistor 201 as well as the 14,500 ohm first stage biasing resistor 202 is also a feature which eliminates a certain type of undesired oscillation. The output of the tubes 107 and 108 and the input to the wattmeter is of a conventional nature. A special feature of this amplifier is that the change in phase shift due to changing amplitude of voltage at frequencies ranging from 300 cycles per minute to 3,600 cycles per minute is very small. There is some change in phase shift due to changing frequency but not due to changing amount of voltage at a given frequency for the range of frequencies mentioned above.

Phase shift due to changing signal voltage is minimized by the input and output transformer designs by the proper choice of amplifier circuit constants and by restricting the loading of the tubes to within fixed limits. A power supply of a conventional nature as 220 may be used to feed the tubes.

The resistor and switch below each pick-up coil in Figs. 3A and 3B selectively change the sensitivity, that is, they allow the choice of either of two proportions of the pick-up voltage. For example, on the left pick-up, when the pick-up sensitivity switch 23 is switched to the left position, the entire output of the pick-up is allowed to be used, whereas if it is switched to the right, the proportioning of the resistors 230 and 231 having resistance values 1250 ohms and 7000 ohms in the circuit, is such that only the part of the pick-up voltage across the 1250 ohms is taken from the pick-ups. The right hand pick-up and pick-up sensitivity switch 24 work in a similar fashion and the switches 23 and 24 are both switched at once. This switch is called the pick-up sensitivity switch and is usually used in the left position where the maximum sensitivity is obtained.

To set up this machine, it is necessary to either have a perfectly balanced crankshaft or rotor for set-up purposes, or to produce the effect of a perfectly balanced rotor in the circuit. For instance, if the rotor is initially unbalanced and causes a voltage to be generated in the left pick-up coil 16 and if another voltage of an amount equal to the left pick-up voltage and 180° out of phase with the left pick-up voltage were put in series with the left pick-up, the two voltages would nullify each other and would add to zero and so far as is apparent in the rest of the circuit, the voltage in the left pick-up would be zero and there would be effectively zero vibration at the left pick-up. The voltage in the left pick-up coil can be added to an equal amount of voltage, which consists of components and in this particular circuit, components are used which are 90° apart. Such component voltages, with my invention, are obtained from generator 25, whose rotor 26, and four windings 27, 28, 29, and 30 spaced 90° apart, are shown in the upper central part of Fig. 3A. When the compensator switch 31 with terminals 32 to 46 inclusive and 47', is switched to its upper position, the generator windings 27, 28, 29 and 30 are placed in the circuit.

Referring to generator winding 27, it will be noted that it is placed across a resistance 110 composed of three parts, upper, middle and lower. Across the middle and lower parts is connected a potentiometer 47. The resistance values of the middle and lower parts are equal. With this type of connection, the voltage across the output leads 117—116 is zero when the moving point of the potentiometer 47 is at its mid-point between the two ends. On one side of this point the voltage output is in one direction whereas on the other side there is 180° difference. Therefore, it is possible to obtain a voltage from this same winding 27 varying in an amount and reversible in direction.

Referring to generator winding 28, it will be noted that it is placed across a resistor 111 composed of three parts, upper, middle and lower. Across the middle and lower parts is connected a potentiometer 48. The middle and lower parts of the resistor 111 are of equal resistance value so that with this type of connection, the voltage across the output leads is zero when the moving point of the potentiometer 48 is at its mid-point between the ends. On one side of this point the voltage output is in one direction, whereas on the other side there is 180° difference. Therefore, it is possible to obtain a voltage from this same winding 28 varying in amount and reversible in direction.

Generator winding 28 is thus similar to that of winding 27 and is, through conductor 116 connected in series with it. However, it is 90° displaced around the stator from generator winding 27. Thus it is possible to obtain two 90° components of voltage each variable in amount and reversible in direction.

Generator windings 29 and 30 are similar to 27 and 28. Windings 27 and 28 are connected in such a way that they can be put in series with the left pick-up coil 16, whereas windings 29 and 30 can be put in series with the right pick-up coil 17. Thus a voltage of any phase angle in the left pick-up coil can be compensated for or nulled by using the proper components from generator windings 27 and 28 and the same holds for the right pick-up voltage and generator windings 29 and 30. So far in the explanation, the current components for the left pick-up can only be obtained by manipulating potentiometers 47 and 48 simultaneously until the sum of the compensator voltage and the voltage in the pick-up coil equals zero. A similar condition obtains for pick-up 17 for which potentiometers 89 and 90 are simultaneously manipulated.

It is not necessary to have a perfectly balanced rotor to set up the balancing machine. An unbalanced rotor may be used. However, in this instance, generator 25 will have the effect of compensating for such initial unbalance. This is the sole purpose of generator 25.

However, it is possible to take advantage of the wattmeter method of voltage measurement to enable the compensator voltages to be chosen independently of one another. For example, with selector switch 71 set at position A, let the voltage from the initial unbalance compensating generator windings 27 and 28 be placed across the voltage coil 85 of the wattmeter, then adjust the stator of the sine-wave generator 57 until the voltage from generator winding 28 causes no meter deflection. The effect can be tested by varying potentiometer 48 and adjusting the phase of the sine-wave generator 57 until a variation of 48 causes no meter reading variation. Then variation of potentiometer 47 only will cause a meter reading variation. Switch then by means of selector switch 71 to position B to the winding of the second sine-wave generator 58 which is available and adjust its phase until variation of potentiometer 47 causes no meter reading variation. Then potentiometer 48 will be the only one of the two which will cause a meter reading to vary. Leave the generator set for an indication of potentiometer 48 and placing the generator windings 27 and 28 in series with the left pick-up and across the wattmeter moving coil 85, then the wattmeter indication will be proportional to the voltage from potentiometer 48 plus the part of the left pick-up voltage which is in phase or 180° out of phase with the voltage from potentiometer 48. Then potentiometer 48 can be adjusted until the meter reads zero, then switch to the other sine-wave generator winding and the meter reading will be proportional to the voltage of potentiometer 47 plus the part of the left pick-up voltage which is either in phase or 180° out of phase with the voltage of potentiometer 47. Therefore, by adjusting potentiometer 47, the meter can be caused to indicate zero. This concludes a theoretical description of how the left pick-up voltage can be nulled, that is, added to an equal and opposite voltage by two operations after the two generators are properly lined up with respect to the generator windings 27 and 28. A similar description will hold for nulling the right pick-up voltage with generator windings 29 and 30. Since winding 30 is in equal or opposite phase to winding 27 and winding 29 is in equal or opposite phase to winding 28, the sine-wave generator phase settings used with windings 27 and 28 can also be used with windings 29 and 30.

After the above general explanation of how the unbalance effects can be effectively eliminated, it is felt that a step-by-step description of how an operator will proceed to set up the machine and determine the location and amount of unbalance in a crankshaft will most clearly bring out the operation of the remainder of the circuit. The following are the directions in proper sequence for the setting up and operation of the machine:

1. Switch both of the pick-up sensitivity switches 23 and 24 either to the right or to the left. The choosing of the pick-up sensitivity position is determined by the operator's experience with the type of rotor which he is going to balance. Usually this switch is switched to the sensitive position. In Figs. 3A and 3B this means that the pick-up sensitivity switches 23 and 24 should be switched to the left position.

2. Set the sensitivity switch 49 in either the upper or lower position. The sensitivity switch differs from the above-mentioned pick-up sensitivity switch in that its positions conform to scales on the meter and can be switched at any time during the setup. The lower position is ⅕ as sensitive as the upper position. Switching to the sensitive position means the switch 49 is switched to the upper position (lower left-hand part of diagram). Switch-points 50 and 51 switch from one set of transformer taps to another set and consequently change the amount of voltage taken off at the secondary 109 of the transformer. Switch points 52 and 53 change the amount of capacitances which are across the transformer's secondary for taking care of a certain oscillation difficulty which is present in the amplifier. Switch points 54, 55, 56 and 136 change the sensitivity of the nulling circuits A, B, C and D which will be described later.

3. Take all meter readings with the machine running, that is, motor M in operation.

4. Adjust the protractors on the sine-wave generators 57 and 58 for the speed of operation. In the above general description of the method of compensating for initial voltages in the pick-ups, an explanation was given of how to set the sine-wave generator windings in order to have the phases in a fixed relationship to the phases of the voltages in generator 25; but for different speeds slightly different settings are required for the sine-wave generator stator. Therefore, protractors are installed on the sine-wave generator stators and in the original calibration of this machine by the manufacturer and the proper settings of these protractors are predetermined and delivered to the operator for his use when he changes the speed of the rotation of the balancing machine.

5. Adjust the generator current. Preferably a current of 4/10 amperes is drawn from each sine-wave generator (57 and 58) when it is being used. Rheostats 232 and 233 of 50 ohm and 150 ohm are used to adjust this current to the proper value as indicated by an ammeter (see Fig. 3A).

*Compensation for initial unbalance*

6. Set sine-wave generator 57 at zero degrees and generator 58 at 90 degrees. These settings are the ones described above for use with the initial unbalance nulling circuit.

7. Set potentiometers 59, 59', 60, 60', 61, 61' and 62, 62' at zero where this zero position is to the extreme left of the resistor for potentiometers 59 and 60 and to the extreme right of the resistor for potentiometers 61 and 62. This operation will exclude the potentiometers from the circuit since they have no useful purpose at this point but are for use later, as will appear.

8. Set potentiometers 63, 64, 65 and 66, which means setting potentiometers 63 and 64 to the extreme right and potentiometers 65 and 66 to the extreme left.

9. Set reversing switches 67, 68, 69 and 70 at their lower positions. These reversing switches are for a purpose which will appear later.

10. Set compensator switch 81 to "in," which corresponds to setting switch 81 at its upper position. This operation puts the compensating voltages furnished by windings 27 to 30 of generator 25 in the circuit.

11. The selector switch 71 has four positions, A, B, C and D. When switched to position A the following complete circuit is obtained. Starting at the left-hand terminal of the pick-up coil 16, the current goes through conductor 72, potentiometer 68, resistor 111, contact member 36, conductor 114, generator winding 28, conductor 115, contact member 38, resistor 111, conductor 116, thence through a similar circuit to generator winding 27, then out of the moving point of potentiometer 47 to conductor 117, switch terminal 73, which is connected to switch point A, thence through conductor 118 to the reversing switch 74. Depending upon which direction switch 74 is switched, the circuit then leads through one of two paths, that is, if switch 74 is in the upper position the current will go through conductor 119, switch 67 to the left-hand terminal of the potentiometer resistor 59', through resistor 59', conductor 120 and back up to the other terminal of switch 74. If switch 74 happens to be in the lower position the current goes through conductor 120 directly to the right-hand terminal of the resistor 59', then through resistor 59' to the switch 67, conductor 119 and back up to the other terminal of switch 74. Thus, depending upon the polarity of switch 74, the polarity of the voltage across resistor 59' is either one direction or the other.

After leaving the reversing switch 74, the circuit leads through conductor 122 to the A terminal of switch pole 75 and then through conductor 123, through switch terminal 23 to its left contact member, conductor 124, thence to the right-hand terminal of the left pick-up coil 16. A voltage is thus put across the potentiometer 63 and following the line going out of the potentiometer 63 from its left-hand side, through conductor 125 to switch 76 through its A contact member, conductor 126, potentiometer 78, conductor 127, to the A contact member of switch terminal 77. The potentiometer 78, which is passed in this circuit, is set at zero, therefore, it does not affect the circuit. After leaving switch 77 the circuit leads through the primary 82 of the transformer, conductor 128, back to switch terminal 83, through its A contact, conductor 129 to the potentiometer 63; the voltage of windings 27 and 28 thus being transferred to the input transformer primary 82 of the amplifier. This voltage is amplified and put across transformer 84 and through conductors 130 and 131 to the voltage coil 85 of the wattmeter. At the same time, switch terminal 86 has connected the sine-wave generator 57 across the current coil 87 of the wattmeter, the circuit being from the winding of sine-wave generator 57, through conductor 132, contact member A of switch 86, conductor 133, ammeter 88, conductor 134, current coil 87 of the wattmeter, conductor 135 to the winding of sine-wave generator 57.

12. Null the wattmeter with compensating potentiometer 47. The circuit is thus set up so that compensating generator 25 with potentiometer 47 is in phase with generator 57 and the wattmeter reading is nulled by adjusting potentiometer 47.

13. Set selector switch 71 on B. Under these conditions, which are similar to those described above, generator windings 27 and 28 in series with the left pick-up coil are placed across the second network, which is indicated as "Left—B" and this voltage is, in turn, amplified and placed across the voltage coil 85 of the wattmeter. At the same time, sine-wave generator 58 is switched across the current coil 87 of the wattmeter.

14. Null the wattmeter with the potentiometer 48. At this condition, the meter reading can be nulled by adjusting potentiometer 48. This completes the cancellation of the "initial" voltage in the left pick-up.

15. Set selector switch 71 on C.

16. Null the wattmeter with potentiometer 89.

17. Set selector switch 71 on D.

18. Null the wattmeter with the potentiometer 90. These operations switch the compensator voltage and right pick-up voltage across potentiometers 65 and 66, and in turn, compensate for the "initial" voltage in the right pick-up in a manner similar to that described for the left pick-up.

*Setting up the networks*

After a perfectly balanced rotor is provided or after the voltages produced in the pick-ups by the unbalance in the rotor have been compensated by the potentiometers as described above, the next step in the setup of the machine is to do what is usually called "setting up the networks." The theory of the "networks" is clearly described in Patent No. 2,165,024 by F. C. Rushing and myself, issued July 4, 1939, and entitled "Indicating balancing machine." In general this procedure involves the provision of circuits which prohibit undesirable voltages from passing them. Fig. 1 shows a rotor with four unbalanced correction positions 1, 2, 3 and 4. It is required that two of the positions, such as 1 and 4, be in one axial plane and the other two positions, such as 2 and 3, be in another axial plane. The four positions may be located in four separate transverse planes or two of the positions can be located in one transverse plane, while the other two are either in separate transverse planes or in the same transverse plane together. The figure shows the most general case of unbalance correction locations, and generally these networks will be such that when unbalances for 2 and 3 are to be indicated, a sine-wave generator circuit whose voltage is 90° out of phase with the pick-up voltages produced by unbalances 1 and 4, so as to nullify the effects of unbalances 1 and 4, will be used. Also when unbalances 1 and 4 are to be indicated, a sine-wave generator circuit whose voltage is 90° out of phase with the pick-up voltages produced by unbalances 2 and 3, so as to nullify the effects of unbalances 2 and 3, will be used. Then to read unbalance 2 independently of unbalance 3, a network with zero voltage output for the case where only an unbalance 3 is in the rotor will be used. Three other similar networks are used in connection with indicating unbalances 1, 3 and 4, respectively. The procedure in detail for setting up these circuits is as follows:

19. Place a trial weight on the rotor or crankshaft at 4.

20. Set the selector switch 71 at C, it being noted that the "Right—C" network is being used and that sine-wave generator 58 is being used.

21. Null the reading of the wattmeter by adjusting the phase of the output of generator 58. This zero reading indicates that voltages produced by an unbalance at point 4 are 90° out of phase with the generator voltage at the wattmeter, and since points 1 and 4 are in the same axial plane of the rotor and the pick-up voltages produced by an unbalance at point 1 are in phase with those produced by an unbalance at point 4, the generator setting which has just been made will give the same results for an unbalance either at points 1 or 4.

22, 23. Remove the trial weight from location 4 and add a trial weight at location 3.

24. Set the selector 71 at D, it being noted that the "Right—D" network is being used and that generator 57 is being used.

25. Null the wattmeter reading by adjusting the phase of the output of generator 57 in a manner similar to the description given for the previous generator adjustment. This generator setting is such that its voltage is 90° out of phase with the pick-up voltage at the meter and this setting holds good for an unbalance either at points 2 or 3.

26. Leave the unbalance at location 3; switch the selector switch 71 to position B, it being noted that the "Left—B network is being used and that generator 58 is being used. Now the generator voltage obtained from generator 58 is 90° out of phase with the voltages which would be produced by unbalances in the axial plane which includes 1—4, hence, it cannot be 90° out of phase with the voltages produced by unbalances in the axial plane which includes 2—3. Therefore, with an unbalance at point 3, the meter reading should be obtained.

27. Null the wattmeter reading by making any necessary adjustments of potentiometer 60, reversing switches 91, 92 and 68.

28. This unbalance at point 3 will, in general, produce a voltage in each of the two pick-up coils 16 and 17. The machine is so constructed that these two voltages will either be in phase or 180° out of phase. The left pick-up voltage is put into the network at reversing switch 91 and the right pick-up voltage enters the switch 92. To null the meter reading it is only necessary that the larger of two voltages be placed across potentiometer 60 and the smaller of the two is across the adjacent resistor 60'. Placing the largest voltage across the variable potentiometer is accomplished by switching 68. To make the voltage across the potentiometer 180° out of phase with respect to the voltage across the adjacent fixed resistor, one of the reversing switches 91 or 92 can be used to obtain any polarity required. Then by adjusting potentiometer 60, a portion of the voltage across the potentiometer 60 can be chosen equal in magnitude to the voltage across the resistor 60' and if the polarity is opposite, the resulting voltage across potentiometer 64 can be made zero. At this point, a circuit is obtained with which voltages produced by unbalances at points 1 and 4 will not cause the meter to read because of the characteristics of the generator 58 which is in the circuit, and which will not give a reading of the meter when an unbalance is at point 3 because of the characteristics of the "Left—B" network but which cause the meter to read an unbalance at point 2.

29, 30. Remove the trial weight from position 3 and add a trial weight at position 2 and throw the selector switch 71 to C.

31. Null the wattmeter reading by doing anything necessary with potentiometer 61 or with reversing switches 94, 95 and 69. Explanation of what goes on during this operation is similar to the explanation of the "Left—B" network. This particular circuit is one which will not give an indication for unbalances located at points 1, 2 and 4, but in general, it can be expected to give an indication when an unbalance is placed at point 3 because no particular provision has been made to prevent an unbalance at location 3 from producing an indication on the meter.

32, 33, 34. Either leave the unbalance at point 2 or remove it, but add a trial unbalance at location 1, set the selector 71 at D, and null the meter by operating potentiometer 62 or the switches 96, 97 or 70. This operation produces a circuit which will not indicate any effect produced by unbalance at locations 1, 2 or 3 but will indicate the unbalance at point 4.

35, 36, 37, 38. Remove the trial weight from position 1 and add a trial weight to position 4. Set the selector at A and null the meter with 59, 74, 99 and 67. This circuit will not indicate effects produced by unbalances at points 2, 3 or 4 but will indicate the effects produced by an unbalance at point 1.

The above procedure describes means of obtaining four circuits which will give independent indications of unbalances at the four locations. The indications are proportional to the unbalances at the respective locations, but for convenience in operation, the meter arrangement should be calibrated so that the amount of the unbalance can be indicated in some convenient units. The following procedure is for use in doing this calibrating:

39. In crankshaft balancing it is expected that the machine will be set up for either insensitive or sensitive balance indication. Depending upon which type of set-up is desired, switch the sensitivity switch to the corresponding position.

40. Place known amounts of trial weight at the positions 1, 2, 3 and 4 on the rotor.

41. Set the selector switch 71 at A; according to the above description the meter indication obtained will be proportional to the unbalance at position 1 and entirely independent of the unbalances at 2, 3 and 4.

42. Adjust the calibrating potentiometer 63 until the meter indicates the amount of unbalance at position 1 in the desired units.

43. The meter may read negatively before operation 42 is started and in such a case reverse both switches 74 and 99. This operation reverses both of the pick-up voltages going into the network, but since they are reversed simultaneously their mutual relationships remain the same and the network setting functions just the same as before.

44. Instead of reading the unbalance amount directly from the meter, it will probably be desirable in the case of crankshaft balancing to set potentiometer dials at positions which will indicate the unbalance at the respective positions. This can be done by introducing voltages in series with the respective network outputs and by having these voltages variable so that the meter reading can be nulled. Potentiometer 78 is such a device that it will null the meter reading by placing a variable voltage from a supplementary generator 100 in series with the output of the "Left—A" network. Winding 137 is at right angles to the winding in generator 100. The output of the generator 100 is put across the potentiometer 101, which in turn places the voltage across the potentiometer 78. The 4800 ohm and 1500 ohm resistors change the amount of voltage obtained from the potentiometer 101 in a five to one ratio when switch point 56 is switched from A to B. This switch point is on the sensitivity switch which was described hereinbefore. Therefore, to proceed with the setup, set the potentiometer 78 to read the amount of unbalance at location 1. If the nulling potentiometer 78 is to be used exclusively, it is not necessary that the meter be calibrated with potentiometer 63 at the "Left—A" network.

45. So far nothing has been done to make the voltage which is being taken from potentiometer 78 equal to the voltage taken from the "Left—A" network. Therefore, adjust potentiometer 101 until the meter reads zero.

Operations 46 to 60 cover similar calibration steps for unbalances at points 2, 3 and 4, but will be briefly described.

46. Switch selector switch 71 to B.
47. Adjust potentiometer 64 until meter reads amount of unbalance at position 2.
48. (Reverse both switches 91 and 99 if meter reads negative.)
49. Set the potentiometer 79 to read the amount of unbalance at point 2.
50. Null meter with potentiometer 102.
51. Set selector switch 71 at C.
52. Adjust potentiometer 65 until meter reads amount of unbalance at point 3.
53. (Reverse both switches 94 and 95 if meter reads negative.)
54. Set the potentiometer 80 to read the amount of unbalance at point 3.
55. Null meter with potentiometer 103.
56. Set selector switch 71 at D.
57. Adjust potentiometer 66 until meter reads amount of unbalance at point 4.
58. (Reverse switches 96 and 97 if meter reads negative.)
59. Set potentiometer 81 to read amount of unbalance at point 4.
60. Null meter with potentiometer 104.

Now that the machine is calibrated and the networks are set up, it can be used to indicate arbitrary unbalance amounts at the four locations.

61. Up to this point the compensator or generator 25 has been in the circuit and has been compensating for the initial voltages produced by the initial unbalances. All other voltages which have been produced in the pick-ups have been superimposed upon these initial conditions and have not been affected by voltages obtained from the compensating generator. Therefore, to indicate the initial unbalance of the rotor, switch out the compensator or, referring to the wiring diagram, set switch 31 at its lower position and in this position resistors are switched in place of the generator windings; therefore, the impedance of the circuit is not affected by switching the generator out of the circuit. In this condition, the entire unbalance in the rotor can be indicated.

The following procedure is for measuring the unbalance at points 1, 2, 3 and 4:

62. Set selector switch 71 at A.
63. Null the meter reading by turning potentiometer 78.

The reading on the calibrated potentiometer 78 will be an indication of the amount of unbalance at point 1.

64 to 70. Perform similar operations (as in #62 and #63) with the selector at B, C and D, respectively. Then the settings of potentiometers 78, 79, 80 and 81 give direct readings of the weights of the unbalances at points 1, 2, 3 and 4, respectively. Of course, if it is preferred to take meter readings instead of using nulling potentiometers 78, 79, 80 and 81, the meter will need to have been calibrated with potentiometers 63, 64, 65 and 66; then the meter readings obtained when switched to positions A, B, C and D with the nulling potentiometers 78, 79, 80 and 81 set at zero would have been direct indications of the weights of the unbalances in the locations 1, 2, 3 and 4.

71. If at any time when taking readings of the unbalances at positions 1, 2, 3 and 4, the meter reads negatively, this is an indication that there is a negative amount of unbalance based upon the way the machine was calibrated; that is, whether it was calibrated to read the heavy spot of the rotor or the light spot of the rotor. In any case, if a negative reading should occur, the meter can be made to indicate positively by switching both 74 and 99 for the A position and the corresponding switches for the other positions.

The complete setup for a given crankshaft as described above only needs to be made once for each type of crankshaft. After the setup is made, readings of unbalance at positions 1, 2, 3 and 4 can be taken for any number of crankshafts of the particular type for which the machine has been set up. If the dial settings are recorded, the machine can be set up for a second type of crankshaft and then reset for the first type by simply setting the dials at the recorded positions.

In general, the choice of the transverse and axial planes in which the unbalances are to be measured and corrected is arbitrary so long as they conform with the restrictions mentioned previously. However, there are some practical preferences; first, to have positions 1 and 4 as far apart as possible on a given rotor and the same condition holds for positions 2 and 3. This condition tends to make it possible to obtain greater sensitivity and accuracy from the machine; second, the minimum angle between the axial planes which include the correction locations is limited by the ability of the manufacturer to make the unbalance location fall within these limits. This limit is probably about 60°. The maximum angle is limited by the amount of material that will need to be removed to correct for a given unbalance within the two axial planes. One extreme, of course, would be where the two planes were nearly 180° apart, in which case the amounts to be removed would be approaching infinity for any given unbalance between these planes. Furthermore, for an ideal condition as far as minimizing the effect of the phase of the generator voltage on the sensitivity of the indication is concerned, it is preferable to have the two axial planes 90° apart, but there is very little loss due to the generator condition so long as the angle between the two axial planes lies between 60° and 120°.

Various modifications may be made in the device embodying my invention without departing from the spirit and scope thereof, and I desire, therefore, that only such limitations shall be placed thereon as are imposed by the appended claims.

I claim as my invention:

1. A device for analyzing the amount of unbalance of a rotor having four preselected balancing points on the surface thereof, the unbalance components of which are to be determined, the first two of said points being in one axial plane and the second two being in a separate axial plane, comprising, in combination, means for yieldably mounting said rotor so as to allow free oscillation thereof in at least one plane as the result of the unbalance of the rotor, electromagnetic means, responsive to said oscillations, generating an electrical current which is proportional to the amount of unbalance of said rotor, electrical potentiometer means for nullifying the electrical current component caused by unbalance at one of said first two balancing points, a second electrical means for nullifying the electrical current components caused by unbalance at said second two of said balancing points, and means for combining both said electrical means and for measuring the non-nullified electrical component and which is indicative of the unbalance at the other of said first two points.

2. A device for analyzing the amount of unbalance of a rotor having four preselected balancing points thereon, the unbalance components of which are to be determined, all of said points being in different planes which are perpendicular to the axis of said rotor, two of said points being in one plane passing through the axis of said rotor and two other points being in a different plane passing through the axis of said rotor, comprising, in combination, means for yieldably mounting said rotor so as to allow free oscillation thereof in at least one plane as the result of the unbalance of the rotor, electromagnetic means, responsive to said oscillations, generating an electrical current which is proportional to the amount of unbalance of said rotor, means for nullifying the electrical current components caused by two of said points in the same axial plane, means for nulling one of the points in the other axial plane, and means for measuring the non-nullified current component.

3. A device for analyzing the amount of dynamic unbalance of a rotor having four predetermined balancing points on the surface thereof, the first two of which are in one axial plane and the second two of which are in a different axial plane, comprising, in combination, means for yieldably mounting said rotor so as to allow free oscillation thereof in at least one plane as the result of unbalance of the rotor, electromagnetic means, responsive to said oscillations, generating an electric current which is proportional to the amount of vibration of said rotor, a potentiometer network for nulling the effect of one of said first two balancing points, a wattmeter having a stationary coil and a moving coil, said moving coil being in circuit relationship with said potentiometer network, sine wave generator means having a stator winding in circuit relationship with said stationary coil of the wattmeter, the stator winding being angularly disposed so that the voltage developed in said stationary coil is 90° out of phase with that developed in said moving coil thereby nullifying the effects of said second two coplanar points and leaving the effects of only the second of said first two balancing points to be measured.

4. A device as set forth in claim 3 in which a calibrated nulling potentiometer and a nulling generator in phase with said sine wave generator are provided in circuit relation with said potentiometer network for nulling the effects of the second of said first two balancing points as indicated by the wattmeter, whereby a visual indication of the amount of unbalance of such point is given by the setting of said calibrated nulling potentiometer.

5. A device for analyzing the amount of dynamic unbalance of a rotor having four predetermined balancing points thereon two of which are in one axial plane and two being in another comprising, in combination, means for rotating said rotor, means for yieldably mounting said rotor so as to allow free oscillation thereof in at least one plane as the result of the unbalance of the rotor, electromagnetic means, responsive to said oscillations, generating an electrical current which is proportional to the amount of vibration of said rotor, electric generator means together with a wattmeter type meter for nullifying the electrical current components caused by two of said points in the same axial plane, and potentiometer means in circuit relationship with said electromagnetic means for nullifying the current component caused by a point in the other axial plane whereby the unbalance at the remaining point in said last mentioned axial plane may be measured.

6. A device for analyzing the amount of dynamic unbalance of a rotor having four predetermined balancing points on the surface thereof, the first two of which are in one axial plane and the second two of which are in a different axial plane, comprising, in combination, means for yieldably mounting said rotor so as to allow free oscillation thereof in at least one plane as the result of unbalance of the rotor, a pair of electromagnetic pick up means, one at each end of said rotor, for developing voltages responsive to said oscillation, a potentiometer network in circuit relationship with said pair of pick up means so as to null the effect of one of said first two balancing points, an amplifier having input terminals connected to said potentiometer network, a wattmeter type meter having a movable coil connected across the output of said amplifier and having a stationary coil, and a sine wave generator having a rotor mechanically coupled to said aforementioned rotor and a stator winding connected to said stationary coil, the phase relationship of said stator winding being such that the voltage of the stationary coil is 90° out of phase with that in the movable coil thereby nullifying the unbalance effects of said second two points, thereby leaving the unbalance effects of only the second of said first two balancing points to be measured.

7. A device as set forth in claim 6 in which a calibrated nulling potentiometer and a nulling generator in phase with said sine wave generator are provided in circuit relation with said potentiometer network for nulling the effects of the second of said first two balancing points as indicated by the wattmeter, whereby a visual indication of the amount of unbalance of such point is given by the setting of said calibrated nulling potentiometer.

8. Apparatus as set forth in claim 6 together with a second potentiometer network, a second sine wave generator, and switching means for substituting said second potentiometer network and second generator for the first mentioned potentiometer network and first mentioned generator, respectively, so that the unbalance at a point other than the second of said first two balancing points may be measured.

JOHN G. BAKER.